United States Patent
Bryniarski et al.

[11] Patent Number: 5,833,791
[45] Date of Patent: Nov. 10, 1998

[54] CONFORMING END STOPS FOR A PLASTIC ZIPPER

[75] Inventors: David A. Bryniarski, Pittsford; Vernon C. Catchman, Palmyra; David V. Dobreski, Fairport; Michael W. McManus, East Rochester, all of N.Y.

[73] Assignee: Tenneco Packaging, Evanston, Ill.

[21] Appl. No.: 698,955

[22] Filed: Aug. 16, 1996

[51] Int. Cl.⁶ .................................................. A44B 19/36
[52] U.S. Cl. ..................... 156/244.25; 24/400; 24/433; 156/66; 156/308.2
[58] Field of Search .................... 156/244.25, 308.4, 156/309.6, 66, 308.2; 24/388, 400, 436, 433; 383/64

[56] References Cited

U.S. PATENT DOCUMENTS

| | | |
|---|---|---|
| 3,790,992 | 2/1974 | Herz . |
| 4,890,935 | 1/1990 | Ausnit . |
| 5,007,142 | 4/1991 | Herrington . |
| 5,007,143 | 4/1991 | Herrington . |
| 5,010,627 | 4/1991 | Herrington et al. . |
| 5,020,194 | 6/1991 | Herrington et al. . |
| 5,063,644 | 11/1991 | Herrington et al. . |
| 5,067,208 | 11/1991 | Herrington, Jr. et al. ................. 24/400 |
| 5,070,583 | 12/1991 | Herrington . |
| 5,088,971 | 2/1992 | Herrington ............................... 493/203 |
| 5,131,121 | 7/1992 | Herrington, Jr. et al. ................. 24/436 |
| 5,152,613 | 10/1992 | Herington, Jr. . |
| 5,161,286 | 11/1992 | Herrington, Jr. et al. ................. 24/387 |
| 5,189,764 | 3/1993 | Herrington et al. . |
| 5,283,932 | 2/1994 | Richardson et al. . |
| 5,301,394 | 4/1994 | Richardson et al. . |
| 5,301,395 | 4/1994 | Richardson et al. . |
| 5,405,478 | 4/1995 | Richardson et al. ................. 156/308.4 |
| 5,426,830 | 6/1995 | Richardson et al. . |
| 5,431,760 | 7/1995 | Donovan . |
| 5,442,837 | 8/1995 | Morgan . |
| 5,442,838 | 8/1995 | Richardson et al. . |
| 5,448,807 | 9/1995 | Herrington, Jr. ......................... 24/399 |
| 5,448,808 | 9/1995 | Gross . |
| 5,482,375 | 1/1996 | Richardson et al. ...................... 383/64 |
| 5,669,715 | 9/1997 | Dobreski et al. . |
| 5,682,730 | 11/1997 | Dobreski . |

FOREIGN PATENT DOCUMENTS

| | | |
|---|---|---|
| WO95/29604 | 11/1995 | WIPO . |
| WO95/35046 | 12/1995 | WIPO . |
| WO95/35047 | 12/1995 | WIPO . |
| WO95/35048 | 12/1995 | WIPO . |

*Primary Examiner*—Daniel Stemmer
*Attorney, Agent, or Firm*—Arnold, White & Durkee

[57] ABSTRACT

A plastic bag comprises first and second opposing panels, a reclosable zipper, and a slider. The first and second opposing panels are fixedly connected to each other along a pair of sides and a bottom bridging the pair of sides. The reclosable zipper extends along a mouth formed opposite the bottom. The zipper includes a first track with a first profile and a second track with a second profile. The first and second profiles are releasably engageable to each other. The slider is slidably mounted to the zipper for movement between a closed position and an open position. The first and second profiles are engaged to each other while the slider is in the closed position, and the first and second profiles are disengaged from each other in response to movement of the slider from the closed position to the open position. To prevent the slider from going past the ends of the zipper and to provide adequate end strength that resists stresses applied to the profiles during normal use of the bag, end stops in the form of flexible segments severed from a flexible plastic strip, fairly rigid segments severed from an extruded clip profile, or softened plastic material, are applied and secured to opposite ends of the zipper.

17 Claims, 8 Drawing Sheets

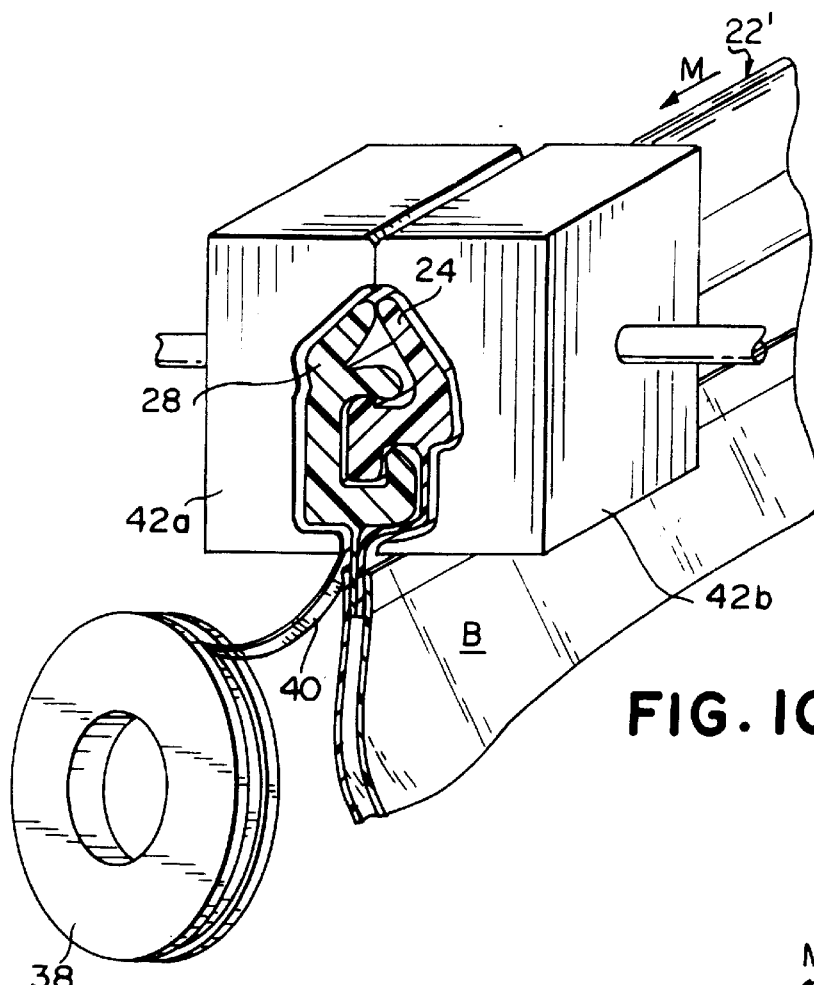
FIG. IC
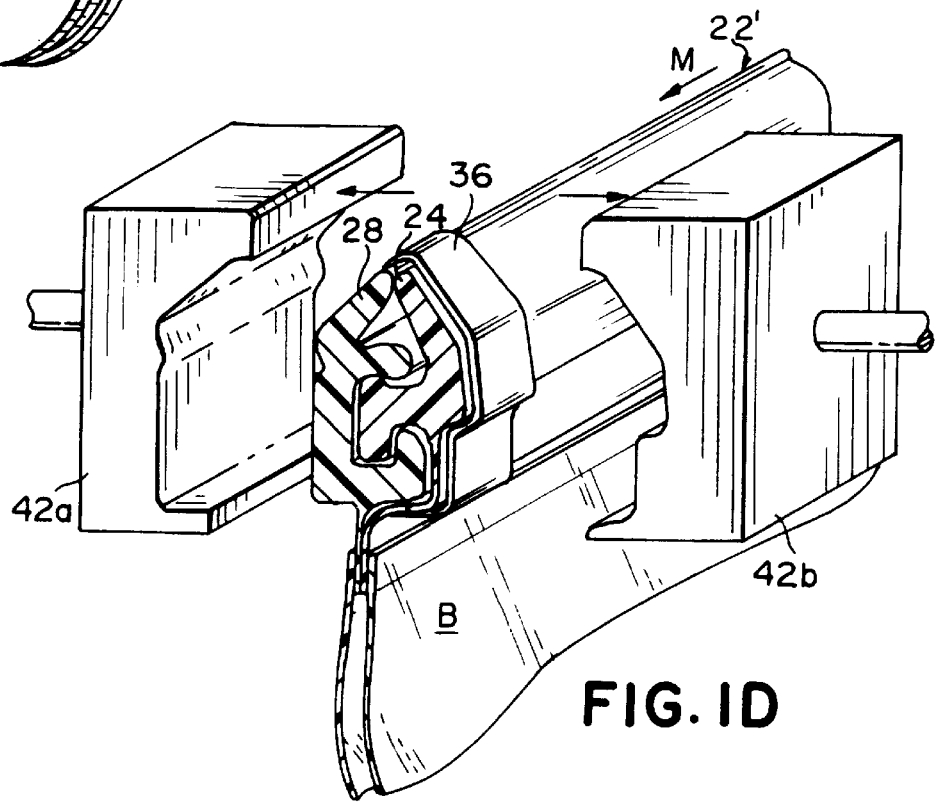
FIG. ID 5,833,791

CONFORMING END STOPS FOR A PLASTIC ZIPPER

FIELD OF THE INVENTION

The present invention generally relates to reclosable plastic bags and, more particularly, to a reclosable plastic bag including a zipper and conforming end stops made from plastic material molded onto opposite ends of the zipper.

BACKGROUND OF THE INVENTION

A reclosable plastic bag typically includes first and second opposing panels fixedly connected to each other along a pair of sides and a bottom bridging the pair of sides. The first and second panels are not fixedly connected along a mouth which is formed opposite to the sealed bottom. Rather, the bag is provided with a reclosable zipper extending along the mouth of the plastic bag. The zipper includes a male track and a female track. In reclosable plastic bags of the type disclosed in U.S. Pat. No. 5,067,208 utilizing a slider to open the zipper, the male track typically includes a male profile and a first fin extending downward from the male profile. Likewise, the female track in such bags with sliders includes a female profile and a second fin extending downward from the female profile. The first and second fins are thermally fused to the inner surfaces of the respective first and second panels.

The male and female tracks are typically free of any plastic material above the male and female profiles in order to permit proper mounting and movement of the slider. The male and female profiles are releasably engageable to each other. When the slider is in a closed position, the male and female profiles are interlocked with each other. In response to moving the slider to an open position, the male and female profiles are disengaged from each other. Once the male and female profiles are disengaged from each other, access to the interior of the bag may be obtained by pulling the first and second panels apart at the mouth.

Opposite ends of the zipper are provided with end terminations. The end terminations perform the dual function of stops for the ends of the zipper to prevent the slider from going past the ends of the zipper and, in addition, they hold the male and female profiles together to resist stresses applied to the profiles during normal use of the plastic bag. In U.S. Pat. No. 5,067,208, each end termination is in the form of a fairly rigid strap/clip that wraps over the top of the zipper. One end of the strap is provided with a rivet-like member that penetrates through the zipper fins and into a cooperating opening at the other end of the strap. Other types of end terminations are disclosed in U.S. Pat. Nos. 5,482,375, 5,448,807, 5,442,837, 5,405,478, 5,161,286, 5,131,121, and 5,088,971.

SUMMARY OF THE INVENTION

The present invention provides end terminations for a zipper of a reclosable plastic bag. The plastic bag comprises first and second opposing panels fixedly connected to each other along a pair of sides and a bottom bridging the pair of sides. The bag is provided with a reclosable zipper extending along a mouth formed opposite the sealed bottom of the plastic bag. The zipper includes a male track and a female track. The male track includes a male profile and a first depending fin extending downward from the male profile. Likewise, the female track includes a female profile and a second depending fin extending downward from the female profile. If the zipper is formed separately from the panels of the bag, the first and second depending fins are thermally fused to inner surfaces of the respective first and second panels. Alternatively, the zipper may be integrally formed with the panels of the bag.

A slider is slidably mounted to the zipper for movement between a closed position and an open position. The male and female profiles are engaged to each other while the slider is in the closed position. The male and female profiles are disengaged from each other in response to movement of the slider to the open position.

To prevent the slider from going past the ends of the zipper and to provide adequate end strength that resists stresses applied to the profiles during normal use of the bag, plastic end stops are molded onto the opposite ends of the zipper. In a first embodiment, the plastic end stops are made from a flexible plastic ribbon that is generally flat and has a uniform thickness in its free state. Each end stop is made from a segment of the flexible plastic ribbon that is wrapped around the male and female profiles at the end of the zipper and stamped with ultrasonic or heated anvils, causing the ribbon segment to conform and fuse to the profiles. In a second embodiment, each plastic end stop is made from a segment of a flexible plastic monofilament instead of the aforementioned plastic ribbon. In a third embodiment, each plastic end stop is made from softened/melted plastic material that is injected through chilled anvils that, in turn, mold the injected plastic material about the profiles at the end of the zipper. In a fourth embodiment, each plastic end stop is made from a segment of a fairly rigid extruded clip profile having an inner profile complementary (conforming) to an outer profile of the zipper. The clip profile segment is cut off from the remainder of the extruded clip profile upon installation onto the zipper. After the clip profile segment is installed onto the zipper, it can be secured in place by ultrasonic or heated anvils or by other sealing techniques.

BRIEF DESCRIPTION OF THE DRAWINGS

Other objects and advantages of the invention will become apparent upon reading the following detailed description and upon reference to the drawings in which:

FIG. 1b is a sectional view taken generally along line 1b—1b in FIG. 1a;

FIGS. 1c and 1d are isometric views illustrating the method of forming end stops on the bag mouth portion in FIG. 1a;

FIGS. 2b and 2c are isometric views illustrating the method of forming end stops on the bag mouth portion in FIG. 2a;

FIGS. 3b, 3c, and 3d are isometric views illustrating the method of forming end stops on the bag mouth portion in FIG. 3a;

FIGS. 4b, 4c, and 4d are isometric views illustrating the method of forming end stops on the bag mouth portion in FIG. 4a.

Figure 1A:
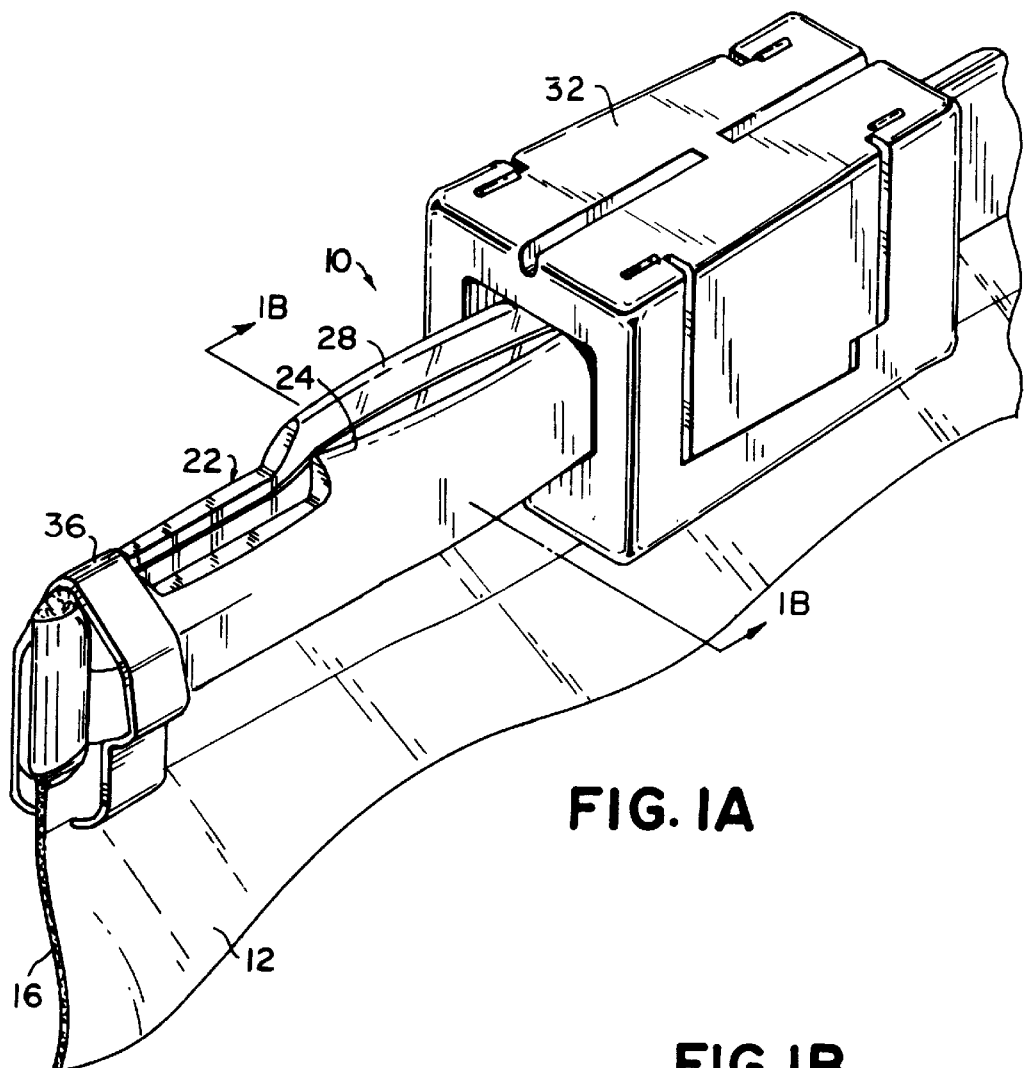
FIG. 1a, is an enlarged isometric view of a mouth portion of reclosable plastic bag in accordance with a first embodiment of the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling thin the spirit and scope of the invention as defined by the appended claims.

DETAILED DESCRIPTION OF THE PREFERRED EMBODIMENTS

Figure 1B:
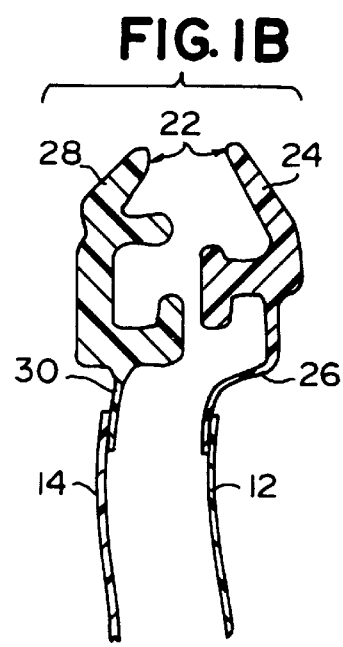

Turning now to the drawings, in which like reference numerals designate like parts, FIG. 1a depicts a mouth portion 10 of a reclosable plastic bag in accordance with a first embodiment of the present invention. As shown in FIGS. 1a and 1b, the plastic bag comprises first and second opposing panels 12 and 14 fixedly connected to each other along a pair of sides 16 (only one shown in FIG. 1) and a bottom (not shown) bridging the pair of sides 16. The bag is provided with a reclosable zipper 22 extending along the mouth portion 10 formed opposite the sealed bottom of the plastic bag.

The zipper 22 includes a male track and a female track. The male track includes a male profile 24 and a first depending fin or flange 26 extending downward from the male profile 24. Likewise, the female track includes a female profile 28 and a second depending fin or flange 30 extending downward from the female profile 28. If the zipper 22 is formed separately from the panels 12 and 14 of the bag, the first and second fins 26 and 30 are thermally fused to inner surfaces of the respective first and second panels 12 and 14. Alternatively, the zipper 22 may be integrally formed with the panels 12 and 14 such that the first fin 26 is integrally formed with the first panel 12 and the second fin 30 is integrally formed with the second panel 14.

To assist in opening the plastic bag, a slider 32 is slidably mounted to the zipper 22 for movement between a closed position and an open position. In the closed position of the slider 32, the male and female profiles 24 and 28 are interlocked with each other. Movement of the slider 32 from the closed position toward the open position (see FIG. 1a) disengages the male and female profiles 24 and 28 from each other and allows a user to gain access to the interior of the plastic bag. Further details concerning the construction and operation of the zipper 22 and slider 32 may be obtained from U.S. Pat. No. 5,067,208 to Herrington, Jr. et al., which is incorporated herein by reference in its entirety.

To prevent the slider 32 from going past the ends of the zipper 22 and to provide adequate end strength that resists stresses applied to the profiles 24 and 28 during normal use of the bag, end stops 36 in the form of plastic ribbon segments (only one shown in FIG. 1a) are molded onto the opposite ends of the zipper 22. The end tops 36 project outwardly from the profiles 24 and 28 and are engageable with the slider 32 to prevent it from moving past the ends of the zipper 22.

An end stop assembly station for applying the end stops 36 is illustrated in FIGS. 1c and 1d. Referring first to FIG. 1c, a spool 38 has a continuous flexible plastic ribbon 40 wound thereabout. The flexible plastic ribbon 40 is generally flat and as a uniform thickness in its free state. To form a single end stop 36, a segment of the flexible plastic ribbon 40 is fed or laid over a continuous zipper 22' and wrapped around the male and female profiles 24 and 28. The ribbon 40 is sufficiently flexible that the wrapped segment in its free state partially conforms to the outer profile of the male and female profiles 24 and 28. After the plastic ribbon segment is wrapped around the male and female profiles 24 and 28, the plastic ribbon segment is stamped with a pair of reciprocating ultrasonic or heated anvils 42a and 42b, causing the ribbon segment to conform and fuse to outer surfaces of the profiles 24 and 28. The inner surface profile of the anvil 42a is complementary to the outer surface profile of the female profile 28, while the inner surface profile of the anvil 42b is complementary to the outer surface profile of the male profile 24. The ribbon segment is cut off from the remainder of the continuous ribbon 40 in response to opening the anvils 42a and 42b (FIG. 1d).

The ribbon segments are preferably applied at intermittent locations along the continuous zipper 22' mounted to a mouth end of a continuous line of bag material B. These intermittent locations correspond to the ends of the zipper 22 of each individual bag to be formed from the continuous bag material B. The bag material B including the continuous zipper 22' assembled thereon is fed to the assembly station in FIGS. 1c and 1d from a continuous supply roll. The direction of movement of the bag material B is indicated by the arrow M in FIGS. 1c and 1d. After a ribbon segment is applied to the zipper 22' in the manner described above at a location corresponding to an end of a zipper 22 of an individual bag to be formed from the bag material B, the bag material B is indexed forward by a distance such that the next ribbon segment is applied to the next location corresponding to an end of a zipper 22. The bag material B is divided into individual plastic bags at a conventional side sealing station downstream from the end stop assembly station in FIGS. 1c and 1d. The side sealing station creates side seals disposed transverse to the direction of the bag material B and between the end stops 36 of adjacent bags.

In an alternative embodiment, each ribbon segment has a width corresponding to the width of two end stops 36 and serves as end stops 36 on the adjacent ends of two connected bags. When the side sealing station creates a side seal between the two connected bags, the ribbon segment is simultaneously divided into two end stops 36. One of the end stops 36 associates with one of the bags, while the other of the end stops 36 associates with the other of the bags. A similar operation of using a single width of material to form two end stops is disclosed in U.S. Pat. No. 5,482,375 to Richardson et al., which is incorporated herein by reference in its entirety.

Figure 2A:
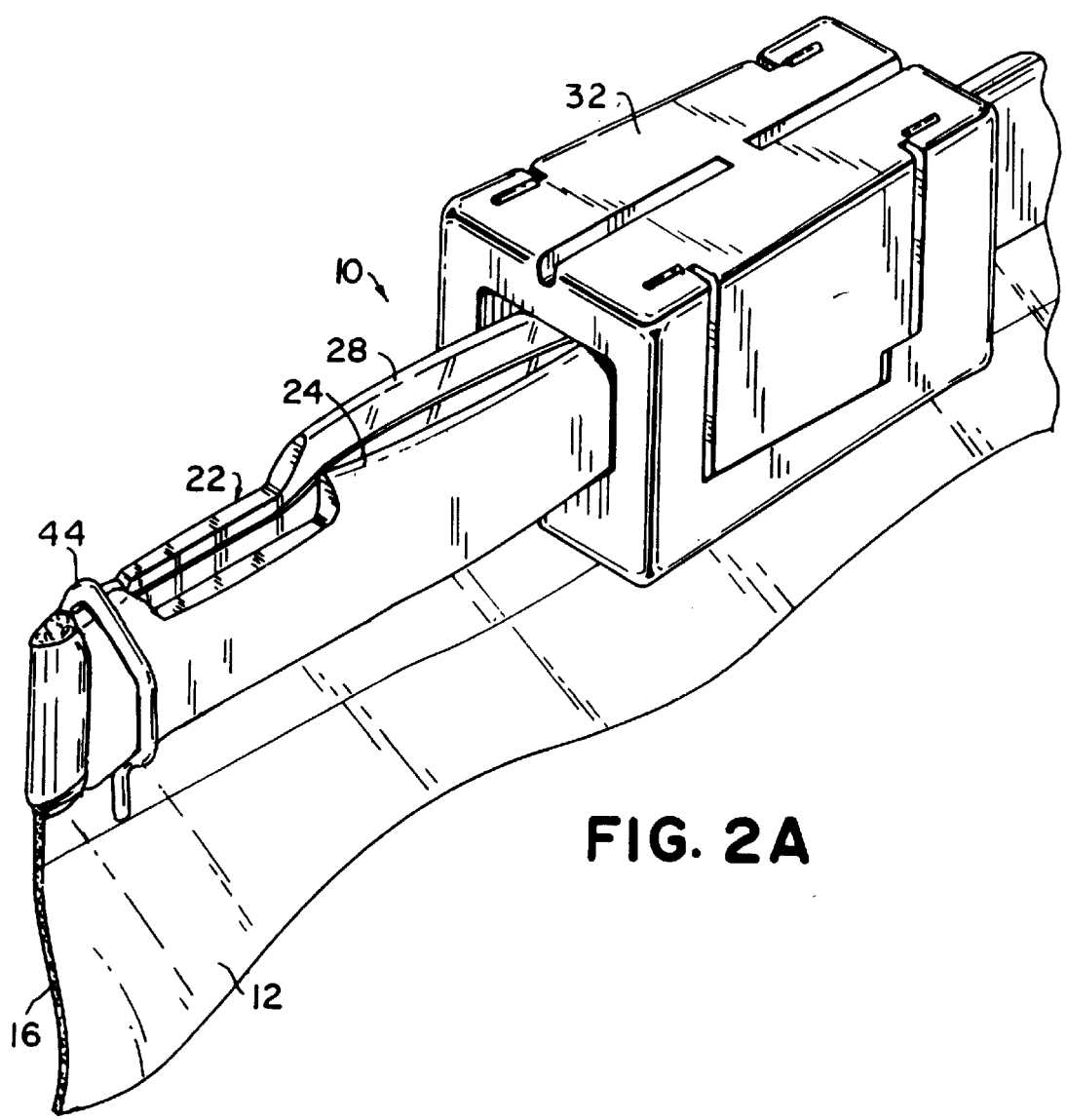
FIG. 2a is an enlarged isometric view of a mouth portion of a reclosable plastic bag in accordance with a second embodiment of the present invention.

FIG. 2a depicts a mouth portion of a plastic bag in accordance with a second embodiment of the present invention. In this embodiment, the ribbon-segment end stops 36 discussed in connection with FIGS. 1a through 1d are replaced with monofilament-segment end stops 44 (only one shown in FIG. 2a). The end stops 44 are in the form of plastic monofilament segments molded onto the ends of the zipper 22. The end stops 44 project outwardly from the profiles 24 and 28 and are engageable with the slider 32 to prevent it from moving past the ends of the zipper 22.

Figure 2B:
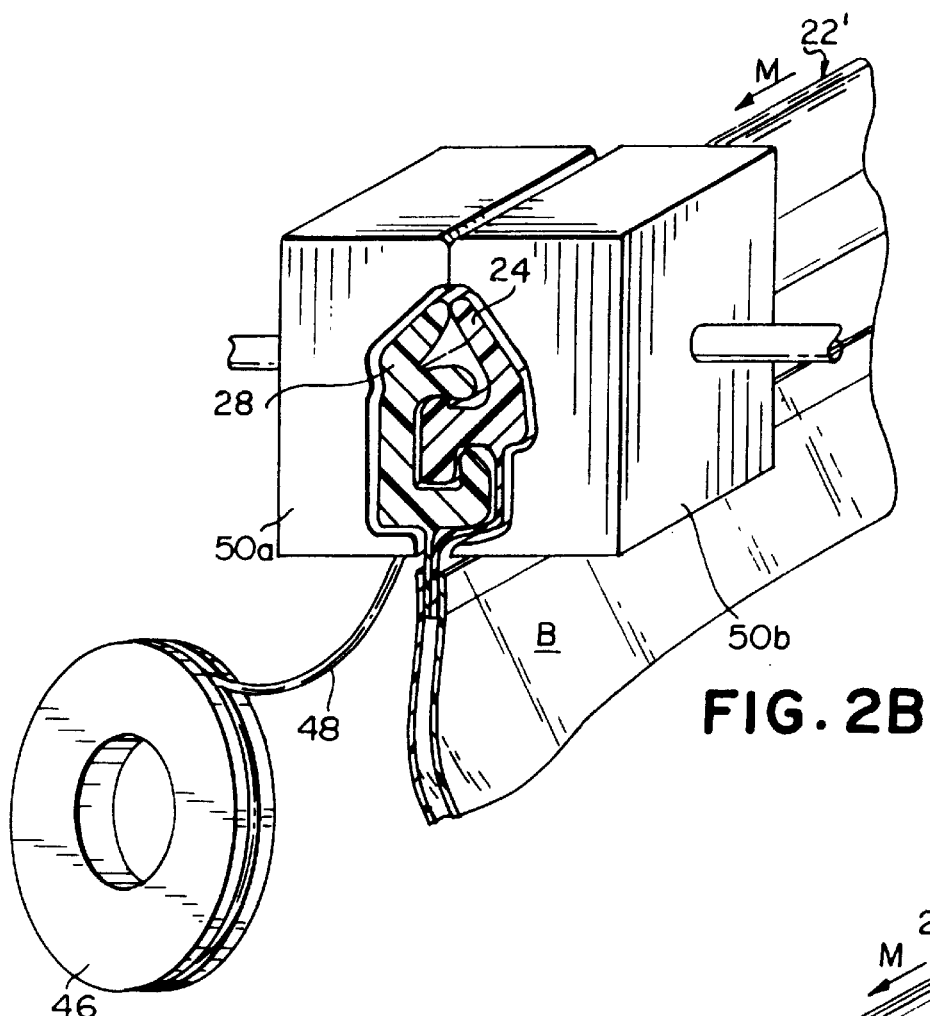
Figure 2C:
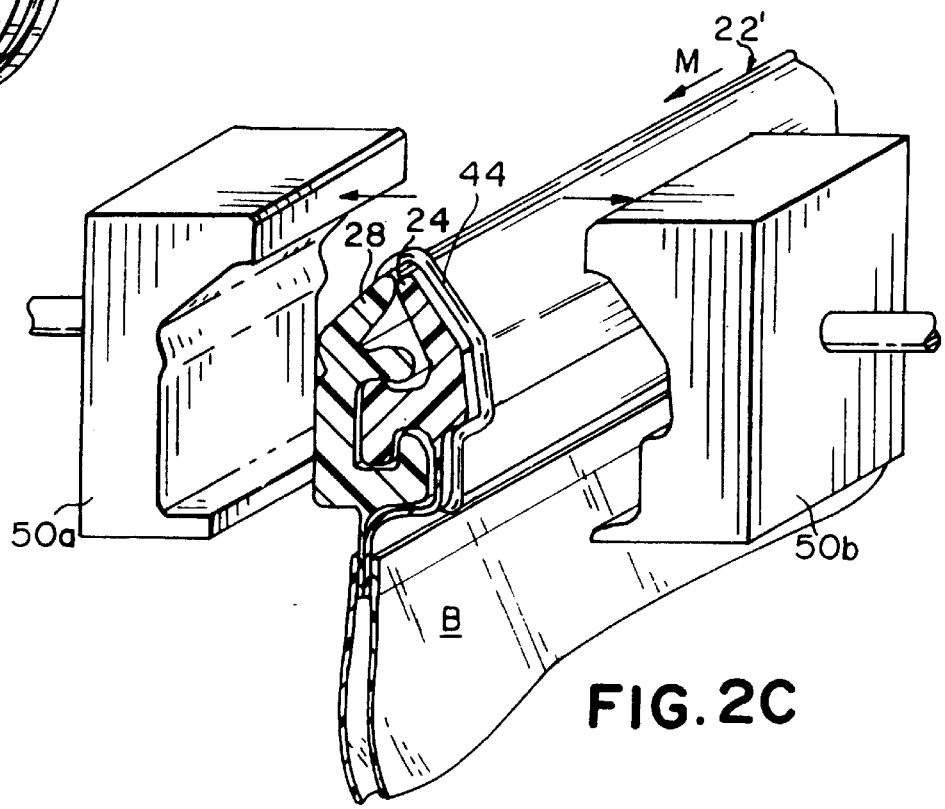

An end stop assembly station for applying the end stops 44 is illustrated in FIGS. 2b and 2c. Referring first to FIG. 2b, a spool 46 has a continuous flexible plastic monofilament 48 wound thereabout. The flexible plastic monofilament 48 has a generally circular cross-section and has a uniform diameter along its length in its free state. To form a single end stop 44, a segment of the flexible plastic monofilament 48 is fed over a continuous zipper 22' and wrapped around the male and female profiles 24 and 28. After the plastic monofilament segment is wrapped around the male and female profiles 24 and 28, the plastic monofilament segment is stamped with a pair of reciprocating ultrasonic or heated anvils 50*a* and 50*b*, causing the monofilament segment to conform and fuse to outer surfaces of the profiles 24 and 28. The inner surface profile of the anvil 50*a* is complementary to the outer surface profile of the female profile 28, while the inner surface profile of the anvil 50*b* is complementary to the outer surface profile of the male profile 24. The anvils 50*a* and 50*b* may form respective inner grooves at the locations where the anvils 50*a* and 50*b* contact the monofilament segment. The monofilament segment is cut off from the remainder of the continuous monofilament 48 in response to opening the anvils 50*a* and 50*b* (FIG. 2*c*). Further monofilament segments are applied at intermittent locations to the continuous zipper 22' assembled on the continuous bag material B as described previously in connection with FIGS. 1*c* and 1*d*.

Figure 3A:
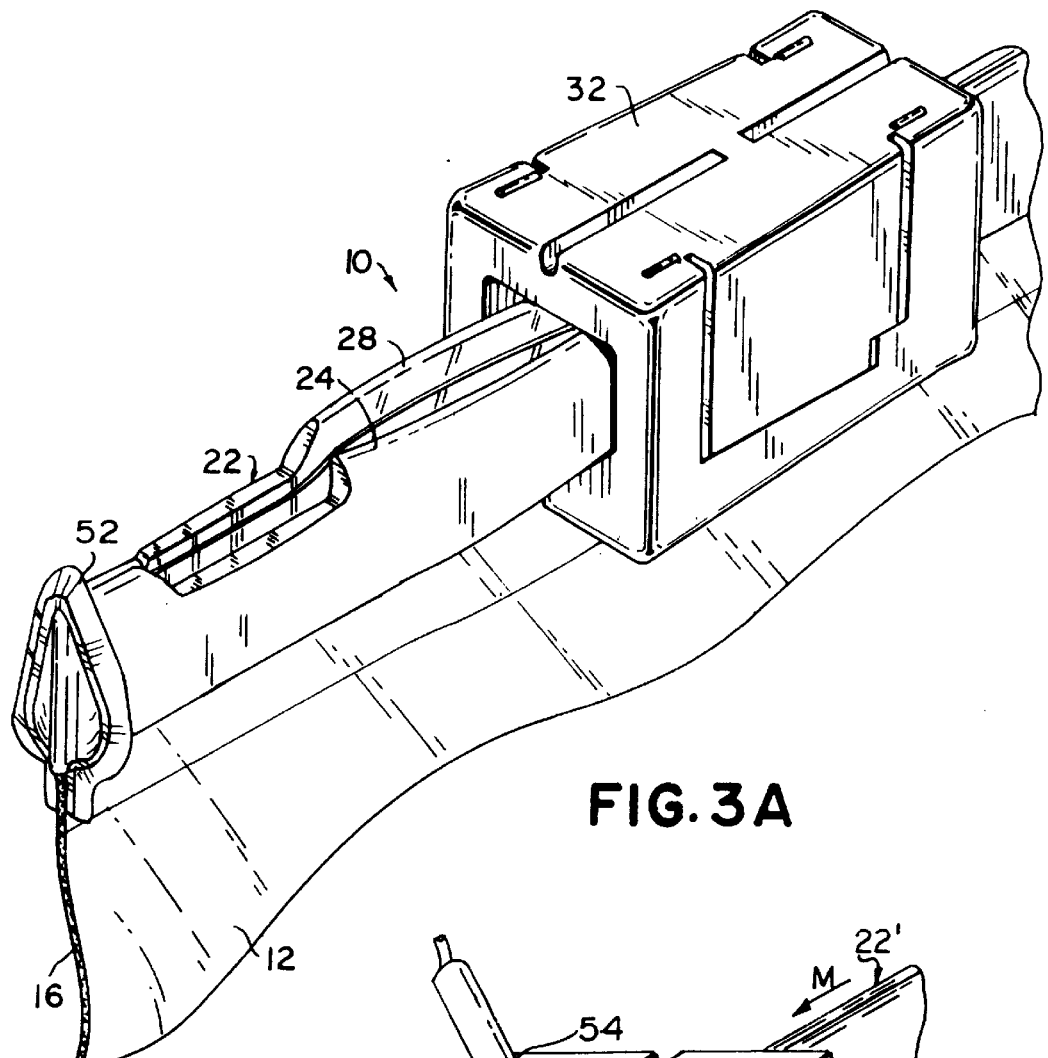
FIG. 3a is an enlarged isometric view of a mouth portion of reclosable plastic bag in accordance with a third embodiment of the present invention.

FIG. 3*a* depicts a mouth portion of a plastic bag in accordance with a third embodiment of the present invention. In this embodiment, the preformed ribbon segments and monfilament segments added to the ends of the zipper 22 in solid form are replaced with plastic end stops 52 added to the ends of the zipper 22 in softened/melted form and then solidified. The end stops 52 project outwardly from the profiles 24 and 28 and are engageable with the slider 32 to prevent it from moving past the ends of the zipper 22.

Figure 3B:
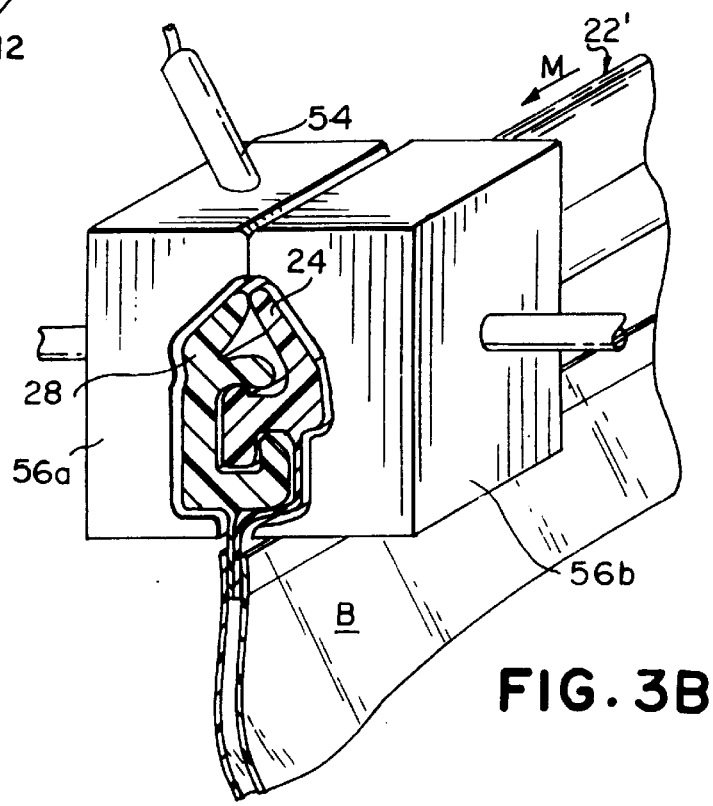
Figure 3C:
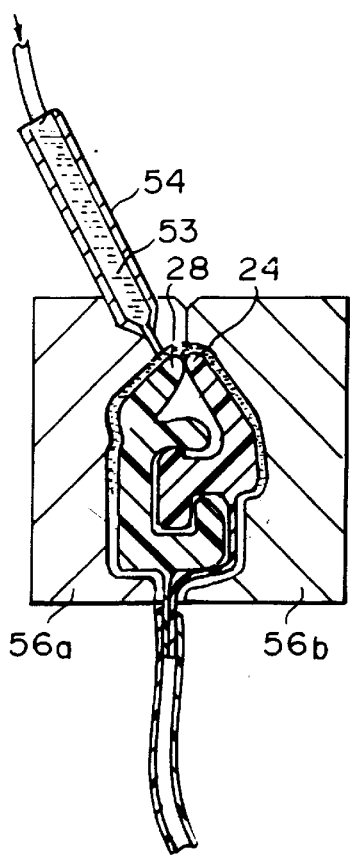
Figure 3D:
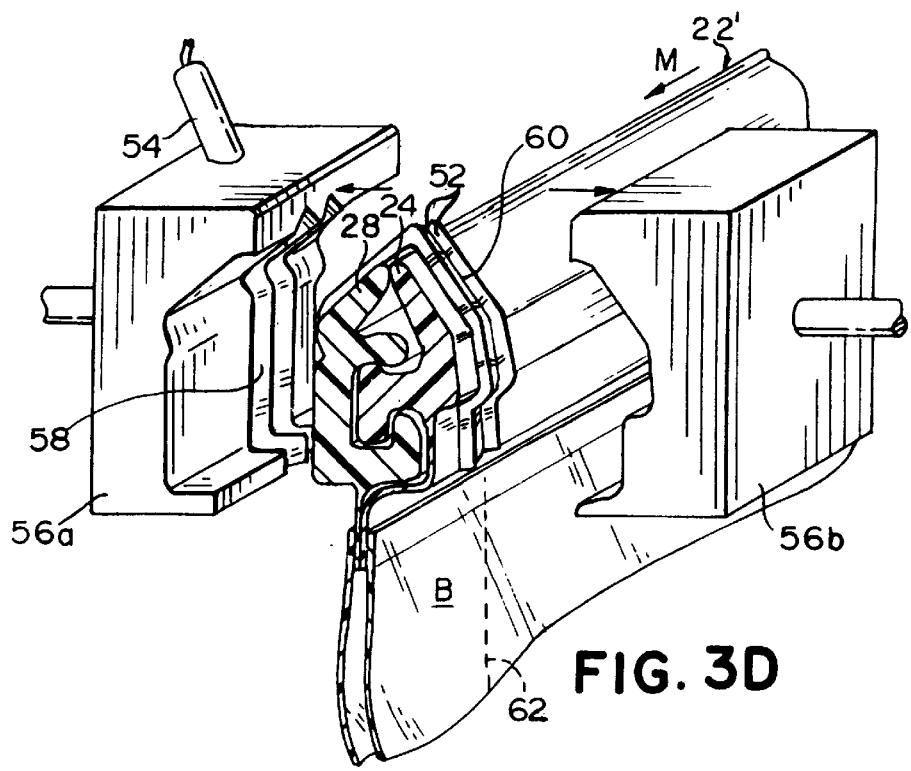

An end stop assembly station for applying the end stops 52 is illustrated in FIGS. 3*b*, 3*c*, and 3*d*. Each plastic end stop 52 is made from softened/melted plastic material 53 that migrates from or is injected from a supply tube 54 through one of a pair of chilled anvils 56*a* and 56*b*. In the illustrated embodiment, the supply tube 54 delivers the melted plastic material to the inner surface of the anvil 56*a*. As best shown in FIG. 3*c*, when the anvils 56*a* and 56*b* are closed around a continuous zipper 22', the melted plastic material is forced about the profiles 24 and 28 by a conventional back pressure device (not shown) coupled to the supply tube 54. The chilled anvils 56*a* and 56*b* mold and solidify the injected plastic material.

As shown in FIG. 3*d*, the inner surfaces of the anvils 56*a* and 56*b* preferably form respective channels 58 for conveying the injected plastic material about the profiles 24 and 28. In the illustrated embodiment, each channel 58 has a generally W-shaped cross-section. The amount of plastic material injected through the channels 58 while the anvils are closed about the zipper 22' is preferably sufficient to form a pair of end stops 52 in side-by-side relationship. The end stops 52 are integrally joined along an area 60 of reduced cross-section and serve as end stops on the adjacent ends of two connected bags. At a conventional side sealing station downstream from the end stop assembly station, a side seal is formed between the two connected bags along this area 60 of reduced cross-section such that one of the end stops 52 becomes part of one of the bags and the other of the end stops 52 becomes part of the other of the bags. The location of this side seal to be formed at the side sealing station is indicated by dotted lines and designated by the reference numeral 62 in FIG. 3*d*.

After the injected plastic material is molded about the profiles 24 and 28 and solidified, the reciprocating anvils 56*a* and 56*b* shift to the open position (FIG. 3*d*) and the continuous bag material B is indexed forward in the direction of the arrow M so that the next pair of side-by-side end stops 52 can be applied to the continuous zipper 22' in the manner described above.

Figure 4A:
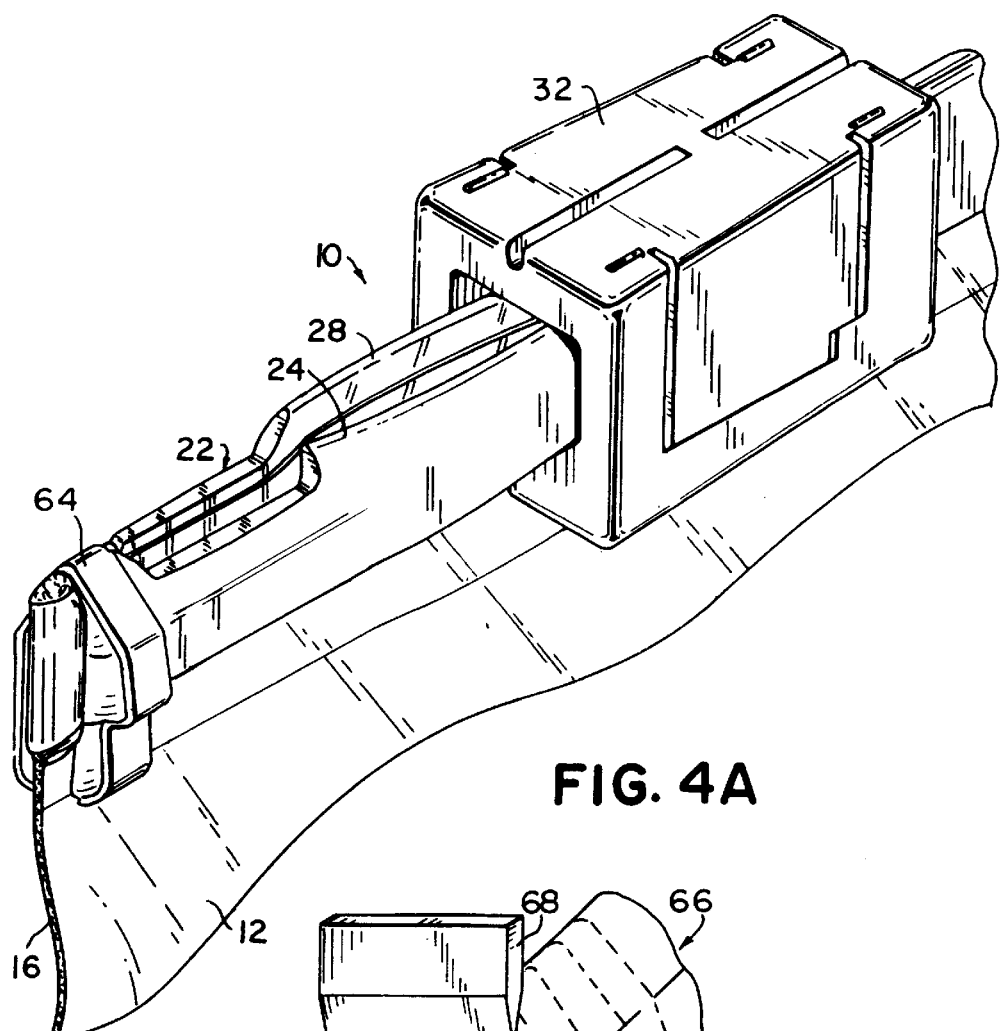
FIG. 4a is an enlarged isometric view of a mouth portion of a reclosable plastic bag in accordance with a fourth embodiment of the present invention.

FIG. 4*a* depicts a mouth portion of a plastic bag in accordance with a fourth embodiment of the present invention. In this embodiment, the previously discussed end stops are replaced with end stops 64 (only one shown in FIG. 4*a*) fused onto the zipper 22 and made from segments of a fairly rigid extruded clip profile having an inner profile complementary to an outer profile of the zipper 22. In other words, the inner cross-section of the clip profile segment substantially matches the outer cross-section of the zipper 22. Such complementary profiles allow for a snug interference fit between the clip profile segment and the zipper 22 even before the clip profile segment has been fused to the zipper 22. The end stops 64 project outwardly from the profiles 24 and 28 and are engageable with the slider 32 to prevent it from moving past the ends of the zipper 22.

Figure 4B:
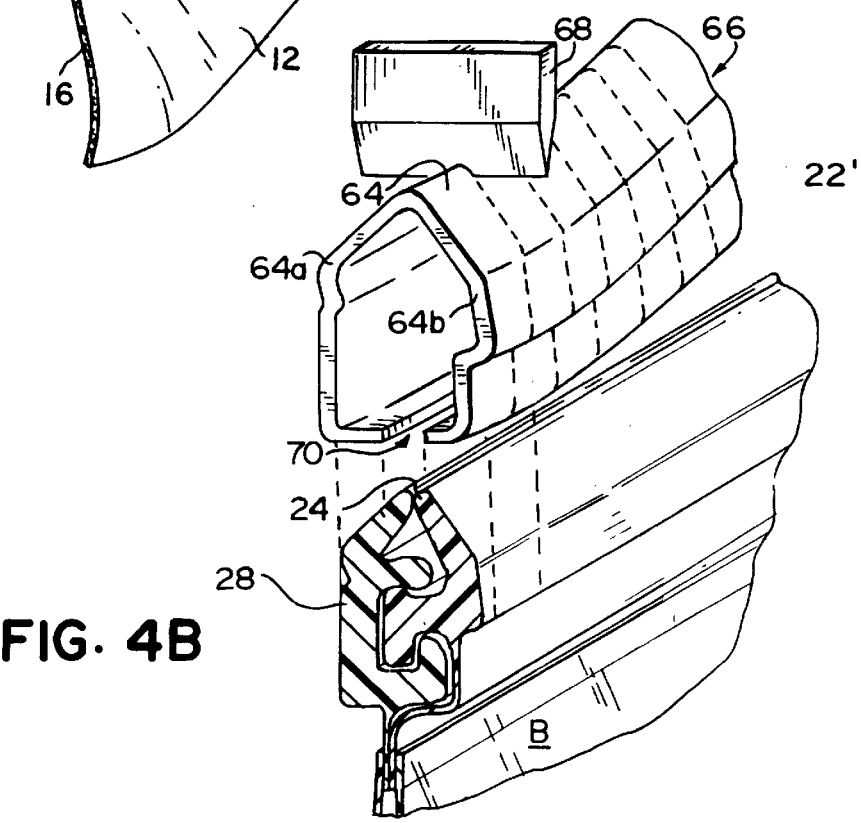
Figure 4C:
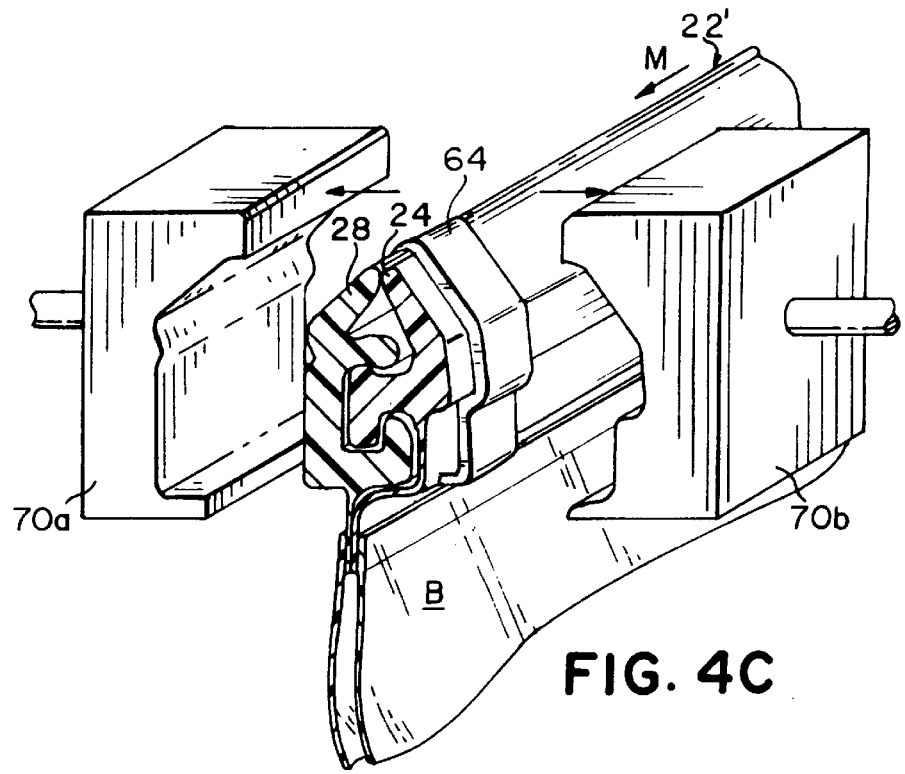
Figure 4D:
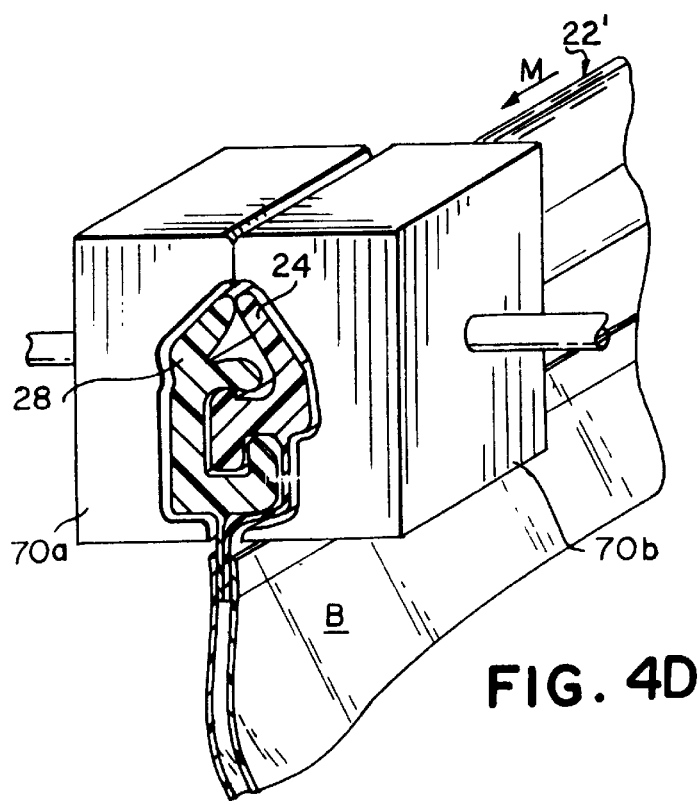

An end stop assembly station for applying the end stops 64 is illustrated in FIGS. 4*b*, 4*c*, and 4*d*. Referring first to FIG. 4*b*, there is provided a continuously extruded clip profile 66 having, in its free state, an inner profile complementary to the outer profile of the continuous zipper 22'. To apply an end stop 64 to the continuous zipper 22', a clip profile segment is cut off from the remainder of the extruded clip profile 66 using an oscillating cutter 68 and snapped over the male and female profiles 24 and 28 of the zipper 22'. The clip profile 66 is extruded with a lower slot 70 along its length so that the clip profile segment can be snapped over the profiles 24 and 28 by downward vertical displacement (as viewed in FIG. 4*b*). As the clip profile segment is engaged with the profiles 24 and 28, the resilient opposing sides 64*a* and 64*b* (FIG. 4*b*) of the segment are temporarily spread apart. Once the segment has snapped into place around the profiles 24 and 28, the opposing sides 64*a* and 64*b* return to their original position (FIG. 4*c*). The installed clip profile segment may be firmly secured to the profiles 24 and 28 using a pair of reciprocating ultrasonic or heated anvils 70*a* and 70*b* or other sealing means. Additional clip profile segments are applied at intermittent locations to the continuous zipper 22' assembled on the continuous bag material B in the manner described above.

In each of the four embodiments described above, the end stops are composed of a polymer or copolymer that is preferably compatible with the plastic material of the profiles 24 and 28, which are preferably composed of polyethylene. Some possible materials for forming the end stops include low density polyethylene (LDPE), linear low density polyethylene (LLDPE), high density polyethylene (HDPE), polypropylene (PP), polystyrene (PS), and copolymers of the foregoing materials.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of applying end stops to a reclosable plastic bag, said plastic bag including first and second opposing panels fixedly connected to each other along a pair of sides and a bottom bridging said pair of sides; a reclosable zipper extending along a mouth formed opposite said bottom said zipper including a first track with a first profile and a second track with a second profile, said first and second profiles being releasably engageable to each other, and a slider slidably mounted to said zipper for movement between a closed position and an open position, said first and second profiles being engaged to each other while said slider is in said closed position, said first and second profiles being disengaged from each other in response to movement of said slider from said closed position to said open position, said slider stopping at an end of said zipper adjacent to one of said pair of sides, said method comprising the steps of:

extruding a fairly rigid clip profile having in its pre-installed state a non-tubular inner profile substantially complementary to a non-tubular outer profile of said end of said zipper, a lower portion of said clip profile having a slot along its length;

severing an end segment from a remainder of said extruded clip profile;

installing said end segment onto said end of said zipper; and attaching said installed end segment to said end of said zipper.

2. The method of claim 1, wherein said step of installing said end segment onto said end of said zipper includes snapping said end segment over said end of said zipper.

3. The method of claim 2, wherein said end segment includes a pair of resilient opposing sides that temporarily spread apart as said end segment is snapped over said end of said zipper and that return to their original position after said end segment is snapped in place.

4. The method of claim 3, wherein said complementary inner and outer profiles create an interference fit between said end segment and said end of said zipper.

5. The method of claim 1, wherein said step of attaching said installed end segment to said end of said zipper includes thermally fusing said end segment to said end of said zipper using heated anvils.

6. The method of claim 1, wherein said step of attaching said installed end segment to said end of said zipper includes ultrasonically fusing said end segment to said end of said zipper using ultrasonic anvils.

7. A method of applying end stops to a reclosable plastic bag, said plastic bag including first and second opposing panels fixedly connected to each other along a pair of sides and a bottom bridging said pair of sides; a reclosable zipper extending along a mouth formed opposite said bottom, said zipper including a first track with a first profile and a second track with a second profile, said first and second profiles being releasably engageable to each other; and a slider slidably mounted to said zipper for movement between a closed position and an open position, said first and second profiles being engaged to each other while said slider is in said closed position, said first and second profiles being disengaged from each other in response to movement of said slider from said closed position to said open position, said slider stopping at an end of said zipper adjacent to one of said pair of sides, said method comprising the steps of:

extruding a fairly rigid clip profile having in its pre-installed state an inner profile substantially complementary to an outer profile of said end of said zipper, a lower portion of said clip profile having a slot along its length;

severing an end segment from a remainder of said extruded clip profile;

installing said end segment onto said end of said zipper to form a snug interference fit therebetween prior to attaching said end segment to said end of said zipper; and attaching said installed end segment to said end of said zipper.

8. The method of claim 7, wherein said step of installing said end segment onto said end of said zipper includes snapping said end segment over said end of said zipper.

9. The method of claim 8, wherein said end segment includes a pair of resilient opposing sides that temporarily spread apart as said end segment is snapped over said end of said zipper and that return to their original position after said end segment is snapped in place.

10. The method of claim 7, wherein said step of attaching said installed end segment to said end of said zipper includes thermally fusing said end segment to said end of said zipper using heated anvils.

11. The method of claim 7, wherein said step of attaching said installed end segment to said end of said zipper includes ultrasonically fusing said end segment to said end of said zipper using ultrasonic anvils.

12. A method of applying end stops to a reclosable plastic bag, said plastic bag including first and second opposing panels fixedly connected to each other along a pair of sides and a bottom bridging said pair of sides; a reclosable zipper extending along a mouth formed opposite said bottom, said zipper including a first track with a first profile and a second track with a second profile, said first and second profiles being releasably engageable to each other; and a slider slidably mounted to said zipper for movement between a closed position and an open position, said first and second profiles being engaged to each other while said slider is in said closed position, said first and second profiles being disengaged from each other in response to movement of said slider from said closed position to said open position, said slider stopping at an end of said zipper adjacent to one of said pair of sides, said method comprising the steps of:

extruding a fairly rigid clip profile having in its pre-installed state an inner profile complementary to an outer profile of said end of said zipper, a lower portion of said clip profile having a slot along its length;

severing an end segment from a remainder of said extruded clip profile;

installing said end segment onto said end of said zipper; and attaching said installed end segment to said end of said zipper.

13. The method of claim 12, wherein said step of installing said end segment onto said end of said zipper includes snapping said end segment over said end of said zipper.

14. The method of claim 13, wherein said end segment includes a pair of resilient opposing sides that temporarily spread apart as said end segment is snapped over said end of said zipper and that return to their original position after said end segment is snapped in place.

15. The method of claim 12, wherein said step of attaching said installed end segment to said end of said zipper includes thermally fusing said end segment to said end of said zipper using heated anvils.

16. The method of claim 12, wherein said step of attaching said installed end segment to said end of said zipper includes ultrasonically fusing said end segment to said end of said zipper using ultrasonic anvils.

17. A method of applying end stops to a reclosable plastic bag, said plastic bag including first and second opposing panels fixedly connected to each other along a pair of sides and a bottom bridging said pair of sides; a reclosable zipper extending along a mouth formed opposite said bottom, said zipper including a first track with a first profile and a second track with a second profile, said first and second profiles being releasably engageable to each other; and a slider slidably mounted to said zipper for movement between a closed position and an open position, said first and second profiles being engaged to each other while said slider is in said closed position, said first and second profiles being disengaged from each other in response to movement of said slider from said closed position to said open position, said slider stopping at an end of said zipper adjacent to one of said pair of sides, said method comprising the steps of:

extruding a fairly rigid clip profile having in its pre-installed state an inner profile complementary to an outer profile of said end of said zipper, a lower portion of said clip profile having a slot along its length;

severing an end segment from a remainder of said extruded clip profile:

installing said end segment onto said end of said zipper by snapping said end segment over said end of said zipper, said end segment including a pair of resilient opposing sides that temporarily spread apart as said end segment is snapped over said end of said zipper and that return to their original position after said end segment is snapped in place, said complementary inner and outer profiles creating an interference fit between said installed end segment and said end of said zipper prior to attaching said installed end segment to said end of said zipper; and attaching said installed end segment to said end of said zipper.

* * * * *